Sept. 25, 1934.     F. H. RAGAN     1,974,853
AIR METERING DEVICE
Original Filed Sept. 22, 1928     3 Sheets-Sheet 1

INVENTOR
FREDERICK H. RAGAN
BY
Fay, Oberlin & Fay
ATTORNEYS

Sept. 25, 1934.  F. H. RAGAN  1,974,853
AIR METERING DEVICE
Original Filed Sept. 22, 1928  3 Sheets-Sheet 2
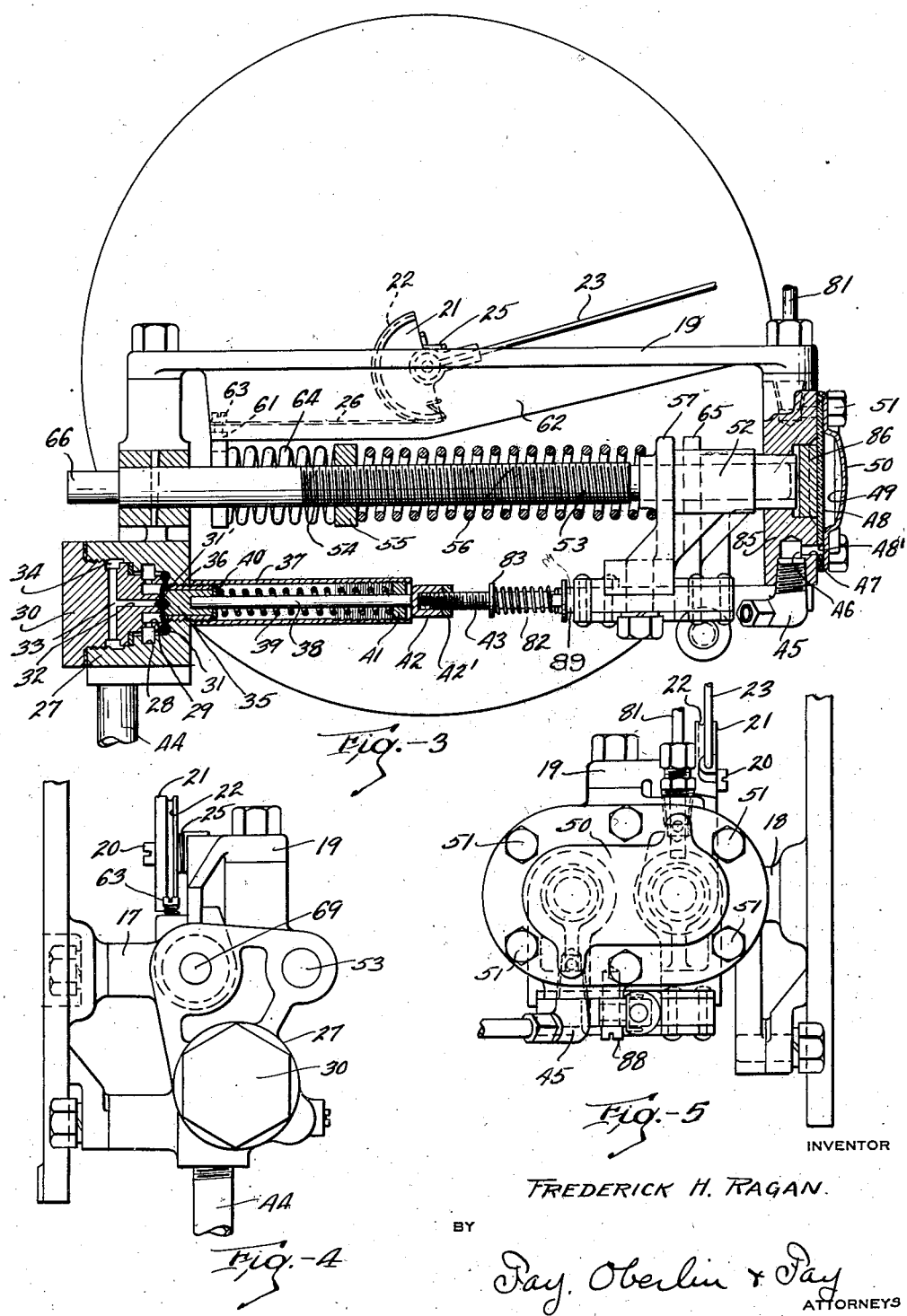
INVENTOR
FREDERICK H. RAGAN.
BY
Ray, Oberlin & Ray
ATTORNEYS Sept. 25, 1934.  F. H. RAGAN  1,974,853
AIR METERING DEVICE
Original Filed Sept. 22, 1928  3 Sheets-Sheet 3

INVENTOR
FREDERICK H. RAGAN
BY
Fay, Oberlin & Fay
ATTORNEYS

Patented Sept. 25, 1934

1,974,853

UNITED STATES PATENT OFFICE 1,974,853

AIR METERING DEVICE

Frederick H. Ragan, Shaker Heights, Ohio, assignor to William R. Barnhart, Cleveland Heights, Ohio Application September 22, 1928, Serial No. 307,600
Renewed January 30, 1934

8 Claims. (Cl. 50—4)

The present invention relates, as indicated, to an air metering device, and more particularly to a device for filling automobile tires or similar containers to a desired pressure. The device disclosed in the present application is an improvement over that disclosed in application of Frederick H. Ragan for Air metering devices, Serial No. 267,248, filed April 4, 1928, and the primary objects thereof are to provide a device of the class described which shall be rapid in its operation, simple in its structure, and which shall be provided with visible means for indicating the progress of and the completion of the filling operation. Further objects of the invention will appear as the description proceeds. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figures 1, 2:
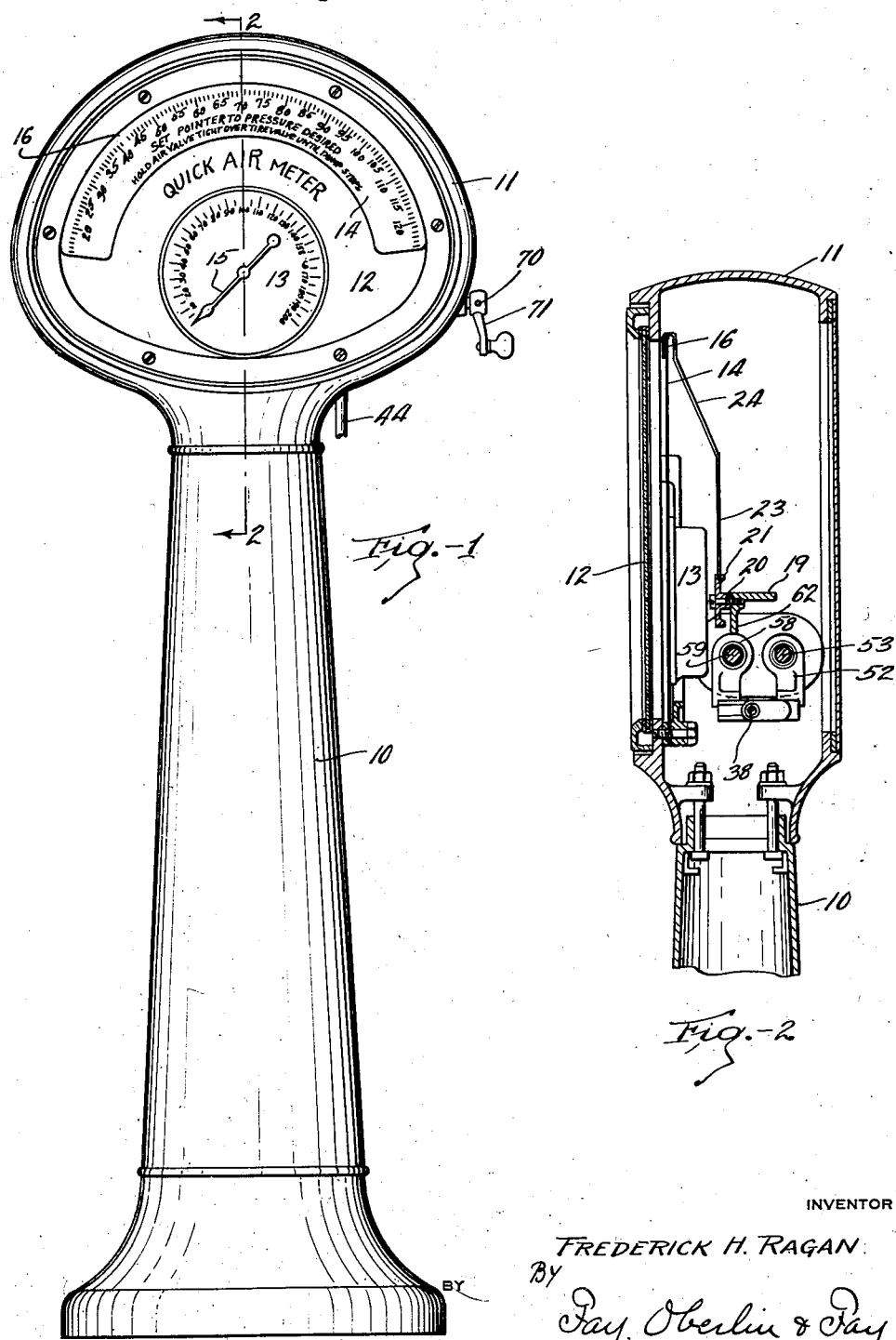
Figure 6:
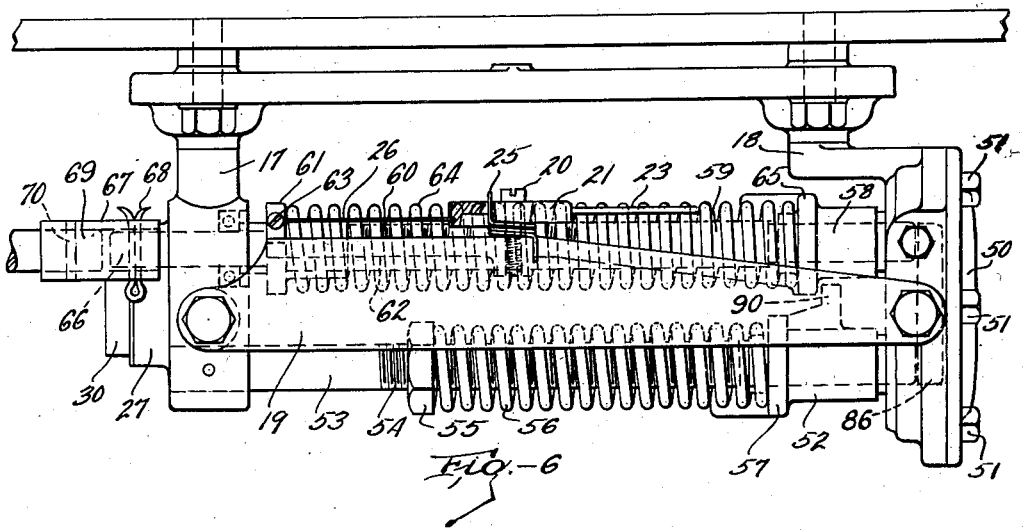
Figure 7:
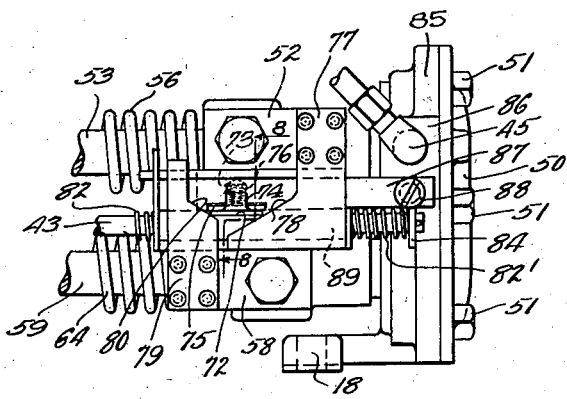
Figure 9:
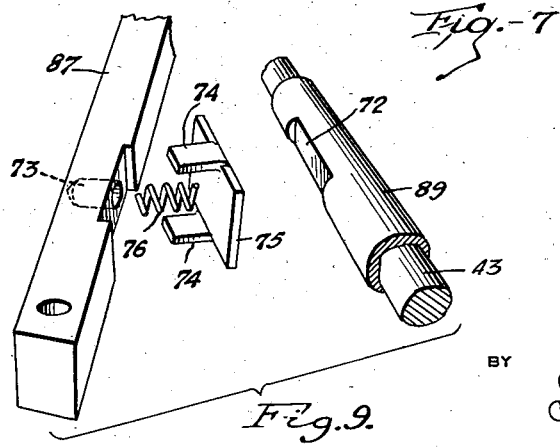
Figure 8:
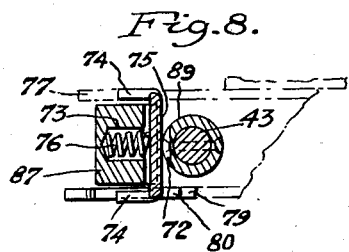

In said annexed drawings:

Fig. 1 is a front elevational view of a device constructed in accordance with the present invention; Fig. 2 is a vertical section taken substantially upon the line 2—2 of Fig. 1, and looking in the direction of the arrows; Fig. 3 is a rear elevational view, partly in section, showing the operating parts of the machine; Fig. 4 is a side elevation taken from the left side of Fig. 3; Fig. 5 is a side elevation taken from the right side of Fig. 3; Fig. 6 is a top plan view of the operating mechanism; Fig. 7 is a fragmentary bottom plan view of the latch mechanism; Fig. 8 is a vertical section taken substantially upon line 8—8 in Fig. 7, and Fig. 9 is an exploded view of the latch mechanism.

Referring more particularly to the drawings, it will be seen that the reference numeral 10 indicates a base or support to the upper end of which is secured a box-like casing 11 provided with a transparent panel 12 in its front face through which are visible a pressure gauge dial 13 and a pressure setting dial 14. A needle 15 cooperates with the dial 13 and a pointer 16 cooperates with the dial 14.

Referring now to Fig. 6, it will be seen that supporting members 17 and 18 mount within the casing 11 a bar 19 to which is secured a screw 20 upon which is rotatably mounted a sector 21. Said sector is peripherally grooved as at 22, and projecting therefrom is an arm 23 which is bent (see Fig. 2) as at 24 to carry the same close to the dial 14, and, adjacent its free end, is rebent to form the pointer 16 overlapping the outer surface of the dial 14. A coiled spring 25 cooperates with the sector 21 to urge the pointer 16 toward the right-hand end of the dial 14 as viewed in Fig. 1. A string 26 is secured to said sector 21 and is adapted to lie in the groove 22. Said string 26 will be further referred to hereinafter.

Referring now to Fig. 3, it will be seen that a block 27 is formed with a socket so shaped as to provide an annular chamber 28, which communicates with a chamber 29 formed in a plug 30, said plug being threaded into said socket. A valve member 31 comprising a diaphragm of rubber, or the like, is retained between the inner end of said plug 30 and the bottom of said socket, and said valve member overlies said chamber 29 and is centrally formed with a spherical projection 31' adapted to close the open inner end of a passage 32 formed in said plug and communicating with a second passage 33 also formed in said plug, said passage 33 communicating at its ends with an annular chamber 34 formed by cooperation of said plug and said socket.

A plunger 35 is slidably mounted in a sleeve 36 which is threaded into an aperture in the base of the block 27 and said plunger is adapted to engage said valve member 31. Threaded to the projecting end of said sleeve 36 is a tubular casing 37 within which are housed a rod 38 upon which the plunger 35 is mounted and a spring 39 sleeved on said rod. Said spring bears at its one end against a follower 40, said follower being so proportioned as, at times, to engage the outer end of the sleeve 36. The opposite end of the spring 39 bears against a collar 41 adjustably threaded into the projecting end of the housing 37. At its outer end, said rod 38 carries a socket member 42 into which is adjustably threaded one end of a valve actuating rod 43 later to be described. The rods 38 and 43 may be locked in adjusted position relative to each other by means of a lock nut 42'.

A delivery pipe 44 is threaded into said block 27 and communicates with the interior of said chamber 34; and a second pipe (not shown) communicates also with said chamber 34 and with an elbow coupling 45 which, in turn, communicates with a chamber 46 formed in a block 85 at the opposite end of the mechanism. Of course it is to be understood that this last-mentioned pipe may be connected in the pressure line anywhere that may be convenient, so long as the connection is made at a point beyond the valve 31. The chamber 46 communicates, through a passage 47 formed in said block 85 and an aperture 48' formed in a diaphragm 48, with a chamber 49 formed between said diaphragm 48 and a cover plate 50 secured to said block 85 by means of bolts 51 or equivalent fastening means. The diaphragm 48 is formed preferably of sheet rubber, though it may be formed of some other flexible and slightly distensible material, and is clamped between said block 85 and the cover member 50.

A sleeve 52 is slidably mounted upon a rod 53, and said sleeve has a reduced portion extending through an aperture in the block 85 and into cooperation with a block 86 secured to the low pressure side of the diaphragm 48. The rod 53 is threaded, as at 54, whereby a nut 55 is adjustably mounted thereon. A coiled spring 56 is sleeved on said rod 53 with its one end in engagement with the nut 55 and its opposite end bearing upon a collar 57 formed on the sleeve 52.

A somewhat similar sleeve 58 (see Fig. 6) is slidably mounted upon an end of a shaft 59, and said sleeve 58 also has a reduced portion extending through said block 85 and into engagement with said block 86. Said shaft 59 is threaded as at 60, and an internally threaded collar 61 is mounted on the threaded portion of said shaft. A flange 62 formed on or secured to said member 19 engages in a notch in said member 61 to prevent rotation thereof, and a clamp screw 63 on said collar provides an anchor for the end of said string 26 previously mentioned. A coiled spring 64 is sleeved on said rod 59 and bears at its one end against said nut 61 and at its opposite end against a collar 65 formed on said sleeve 58.

The end 66 of said rod 59 projects beyond the support 17 and is received in one end of a coupling 67, being secured therein by means of a cotter pin 68, or the like. In the opposite end of said coupling there is received one end of a shaft 69, said end being secured in place by means of a soft metal pin 70. A crank arm 71 is secured to the opposite end of said shaft 69.

Referring now to Fig. 7, it will be seen that a latch lock bar 87 is secured to said block 85 by means of a screw 88, or the like, and that said bar 87 is formed with a socket 73 in which is mounted a coiled spring 76. A latch member 75 provided at its opposite ends with arms 74 embracing said bar 87 is urged by said spring away from said bar. A latch sleeve 89 is pinned to said rod 43, and said sleeve is formed on its one side with a notch 72 for cooperation with said latch 75. As will be obvious from an inspection of Fig. 7, said latch member 75 is longer than said notch 72, and is urged toward said rod 43 and sleeve 89 by said spring 76. To said sleeve 52 there is secured a cam plate 77 having a cam surface 78 adapted to cooperate with one end of said latch member 75, and to said sleeve 58 there is secured a cam plate 79 having a cam surface 80 adapted to cooperate with the opposite end of said latch member 75.

It may here be noted that the sleeve 52 is formed with a projecting arm 90 which is so proportioned that it contacts with the collar 65 on the sleeve 58 when said two sleeves are both in their extreme right-hand positions. This arrangement prevents the two cams 77 and 79 from interfering with each other under any circumstances.

The operation of the device is as follows: Assuming that the organization has just been set up and that it is, for the first time, connected to a source of supply of air under pressure, the air will flow from said pressure source and into the chamber 28 formed in the block 27 and the chamber 29 formed in the plug 30. As the pressure builds up in these two chambers, it tends to raise the valve member 31 from the end of the annular wall surrounding the passage 33. As the pressure continues to build up, the effective pressure of the air on the exposed portion of the inner surface of the valve member 31 will eventually overcome the force of the spring 39, and will force the spherical portion 31' of the valve suddenly away from its seat, coincidentally compressing the spring 39 by a slight movement of the plunger 35 and the valve rod 38.

Of course it is to be understood that, when the machine is first set up, the pressure in the chamber 49 is only atmospheric pressure, and this pressure, of course, is overcome by the two springs 56 and 64, so that the two sleeves 52 and 58 are in their extreme right-hand positions. In such positions of the sleeves, the cam surface 80 is engaged beneath the left-hand end of the latch member 75 to prevent that end of the latch member from entering the notch 72, and the cam surface 78 of the cam plate 77 is removed from the right-hand end of said latch member. As soon as the pressure in the chamber 29 attains a value sufficient to move the valve rod 38 to the right, the right hand end of the latch member 75 will drop into the notch 72 under the force of the spring 76, to retain said valve rod in its extreme right-hand, or open, position.

As soon as the spherical portion 31' of the valve member 31 has been moved away from its seat, air flows freely into the chamber 34, pipe 44 and the flexible hose (not shown) connected to said pipe. Of course, it is to be understood that said hose terminates at its free end in the usual tire connection or chuck valve. As has been stated, a pipe connects said chamber 34 with the elbow 45, and so permits air to flow into the chamber 49. Thus, the pressure in the chamber 49 is always substantially equal to that in the chamber 34 and in the supply hose.

As the pressure builds up in the chamber 49, the effective pressure on the diaphragm 48 soon reaches a value such as to overcome the pressure of the spring 64 upon the sleeve 58, and said sleeve is moved to the left. From an inspection of Figs. 3 and 7, it will be seen that a coiled spring 82 is sleeved on said rod 43 and bears at its one end against a nut 83 adjustably mounted on said rod and at its other end against the adjacent face of the sleeve 58. As said sleeve 58 is moved to the left, the spring 82 is compressed to bias the rod 43, its connected valve rod 38, the plunger 35, and the valve 31 toward valve-closed position. Of course the engagement of the latch member 75 in the notch 72 prevents the rods and plunger from movement under the influence of the spring 82.

As the pressure continues to build up in the chamber 49, it reaches a value sufficient to overcome the pressure of the spring 56 against the sleeve 52, and the sleeve 52 is moved toward the left. Such movement of the sleeve 52 carries the cam face 78 of the cam plate 77 into engagement with the right-hand end of the latch member 75 and lifts said end out of the notch 72. The spring 82, in conjunction with the spring 39, immediately forces the rods 43 and 38 to valve-closed position, and the left-hand end of the latch 75, under the influence of the spring 76, snaps into the notch 72 to hold the valve against opening. The chuck valve being closed, the pressure in the chamber 49 is maintained, and such pressure holds the sleeve 58 against movement to the right under the influence of the spring 64. The device is now ready for use.

As will be obvious, the pressure at which the valve will open is dependent upon the load on the sleeve 58, which will hereinafter be called the low pressure sleeve, and the pressure at which the valve will close is dependent upon the load upon the sleeve 52, which will hereinafter be called the high pressure sleeve. The load on the high pressure sleeve is dependent upon the setting of the nut 55, and this setting will normally remain constant, being variable only by the attendant upon removal of the back cover of the casing 11. The load upon the low pressure sleeve, however, is variable by the user by rotation of the crank 71.

Suppose, now, that a user approaches the device with the intention of filling his tires to a pressure of 35 pounds. In Fig. 1, the pointer 16 is set to a pressure of 42 pounds. The user grasps the crank 71 and rotates the same in proper direction to cause the pointer 16 to move to a position where it indicates the numeral 35 on the dial 14. This action involves the movement of the collar 61 toward the left in Figs. 3 and 6 to reduce the compression of the spring 64. As the collar is moved to the left, it pulls upon the string 26 to rotate the sector 21 in a clockwise direction as viewed in Fig. 3 against the force of the spring 25, thus moving the pointer 16 to the desired position. The user then applies the chuck valve to his tire valve, thus putting the chamber 34 and the chamber 49 in communication with the interior of his tire. A pipe line 81 provides communication between the chamber 49 and the pressure-responsive element of the pressure gauge 13. If, then, it happens that the particular tire to which the chuck valve is applied already contains a pressure greater than 35 pounds, so that the device is not actuated, the needle 15 will indicate the pressure in the tire, say 40 pounds. If the user wishes all his tires to contain 35 pounds pressure, he will then permit the escape of some of this air from his tire and again apply the chuck valve.

Presuming the pressure in the tire now to be less than 35 pounds, air begins to drain out of the chamber 34 immediately permitting the spring 64 to move the sleeve 58 toward the right, whereby the cam surface 80 is brought into engagement with the left-hand end of the latch 75 to raise the same out of the notch 72. The movement of the cam plate 77 with the sleeve 52 has compressed a spring 82' sleeved on the rod 43 and bearing at its one end against the adjacent face of the cam plate 77 and at its other end against a washer 84 on the rod 43. Such compression of the spring 82' then aids the pressure in the chamber 29 to move the valve 31 off its seat and, as the valve moves the rods 38 and 43 to the right, the right-hand end of the latch 75 drops once more into the notch 72. Pressure is thus again built up in the chamber 49 to cause the movement of the sleeves 58 and 52 to the left to effect closure of the valve 31, and this cycle continues until the pressure in the tire attains a value such as to prevent the pressure in the chamber 49 from dropping sufficiently to permit the spring 64 to move the sleeve 58 to the right to permit the valve to be opened. This tire pressure will be the pressure indicated by the pointer 16.

As has been indicated, when the pressure in the chamber 29 first begins to lift the valve 31, the spherical portion 31' of said valve remains in engagement with the seat. This engagement is maintained until the web portion (that is, the annular portion between the spherical portion 31' and that portion of the valve which is clamped between the plug 30 and the base of the socket in the block 27) has lifted approximately 1/64 of an inch off the seat. This arrangement provides for a sudden change in the area of the valve exposed to air pressure immediately before any air begins to escape to the tire, whereby a sudden and positive opening of the valve is effected. Without such a provision, the valve would start to leak slowly and the pressure conveyed to the tire might become excessive without the proper operation of the device.

The air passages in the device leading to the tire hose all are larger than the passage through the tire valve or the chuck, and consequently the pressure in the hose increases very quickly.

If the desired tire pressure is raised close to the point at which the valve is set to close, that is, close to the point at which the force of the spring 56 is overcome by the pressure in the chamber 49, it will be seen that the two sleeves, and therefore their cams will move almost together. If the desired pressure is set too close to this closing pressure, one cam would interfere with the other's action were it not for the projection 90 on the sleeve 52 which keeps the two cams separated at least a certain distance at all times. When the extreme pressures are close, the two cams move in unison, and hence the cam which trips the latch to prevent closure of the valve is at the same time helping to compress the spring 82 which causes such closure.

As has been mentioned, the nut 55 is adjustable to vary the pressure of the spring 56 upon the high pressure sleeve 52. Care should be taken, however, that the setting of this nut shall never be such as to require pressure higher than that in the supply tank to overcome the force of the spring 56. If, for example, the nut 55 should be set so that the valve will not be closed until 150 pounds pressure exists in the chamber 49, and the pressure in the main supply tank should drop to 145 pounds, the cam plate 77 would never be moved to the left to lift the latch 75 to permit the valve to close. With the valve remaining open, the tire would thus be subjected to the full 145 pounds tank pressure, and, if the user were depending upon the machine, it is quite probable that he might burst his tire. To prevent this contingency, the spring 39 is provided and is so adjusted that it will close the valve without the assistance of the sleeves whenever the pressure in the main tank drops to a point near, but always slightly above, the pressure at which the device might cease to function.

If it should be desired to admit full tank pressure continuously to the tire hose, a spacer (not shown) may be placed on the rod 59 between the collar 61 and the sleeve 58, and the crank 71 may be rotated until the collar 61, the spacer, and the sleeve 58 are in solid contact. This will prevent the sleeve 58 from being moved to the left, and will thus prevent the compression of the spring 82 which causes closure of the valve 31.

The hereinbefore mentioned soft metal pin 70 is adapted to be sheared in case force is applied to the crank 71 at a time when the pointer arm 23 is held against movement by any means. This pin is, of course, much more easily replaceable than any of the other parts which might be broken or damaged by the application of undue force to the crank 71.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. An air metering device for supplying compressed air to a container in pulsations of heavy pressure, comprising a passage adapted to be connected between a source of fluid under pressure and a container, a valve in said passage, and mechanism responsive to pressure in said passage beyond said valve for opening and closing said valve to effect pulsating delivery through said passage, said mechanism including a latch mechanism adapted to hold said valve in closed position or in open position, a member adapted to be moved by said pressure-responsive means to bias said valve toward closed position, a spring engaging said member and adapted to move the same against the tendency of said pressure-responsive means to move said latch out of position for holding said valve closed, a second member adapted to be moved by said pressure-responsive means to bias said valve toward open position, and a spring engaging said second member and adapted to move the same against the tendency of said pressure-responsive means to move said latch out of position for holding said valve open.

2. An air metering device for supplying compressed air to a container in pulsations of heavy pressure, comprising a passage adapted to be connected between a source of fluid under pressure and a container, a valve in said passage, and mechanism responsive to pressure in said passage beyond said valve for opening and closing said valve to effect pulsating delivery through said passage, said mechanism including a latch mechanism adapted to hold said valve in closed position or in open position, a member adapted to be moved by said pressure-responsive means to bias said valve toward closed position, a spring engaging said member and adapted to move the same against the tendency of said pressure-responsive means to move said latch out of position for holding said valve closed, a second member adapted to be moved by said pressure-responsive means to bias said valve toward open position, a heavier spring engaging said second member and adapted to move the same against the tendency of said pressure-responsive means to move said latch out of position for holding said valve open.

3. An air metering device for supplying compressed air to a container in pulsations of heavy pressure, comprising a passage adapted to be connected between a source of fluid under pressure and a container, a valve in said passage, and mechanism responsive to pressure in said passage beyond said valve for opening and closing said valve to effect pulsating delivery through said passage, said mechanism including a latch mechanism adapted to hold said valve in closed position or in open position, a member adapted to be moved by said pressure-responsive means to bias said valve toward closed position, a spring engaging said member and adapted to move the same against the tendency of said pressure-responsive means to move said latch out of position for holding said valve closed, a second member adapted to be moved by said pressure-responsive means to bias said valve toward open position, a spring engaging said second member and adapted to move the same against the tendency of said pressure-responsive means to move said latch out of position for holding said valve open, and means adjustable by the user for varying the compression of said first spring.

4. An air metering device for supplying compressed air to a container in pulsations of heavy pressure, comprising a passage adapted to be connected between a source of fluid under pressure and a container, a valve in said passage, and mechanism responsive to pressure in said passage beyond said valve for opening and closing said valve to effect pulsating delivery through said passage, said mechanism including a latch mechanism adapted to hold said valve in closed position or in open position, a member adapted to be moved by said pressure-responsive means to bias said valve toward closed position, a spring engaging said member and adapted to move the same against the tendency of said pressure-responsive means to move said latch out of position for holding said valve closed, a second member adapted to be moved by said pressure-responsive means to bias said valve toward open position, a spring engaging said second member and adapted to move the same against the tendency of said pressure-responsive means to move said latch out of position for holding said valve open, means adjustable by the user for varying the compression of said first spring, and means inaccessible to the user for varying the compression of said second spring.

5. An air metering device for supplying compressed air to a container in pulsations of heavy pressure, comprising a passage adapted to be connected between a source of fluid under pressure and a container, a valve in said passage, and mechanism responsive to pressure in said passage beyond said valve for opening and closing said valve to effect pulsating delivery through said passage, said mechanism including a flexible diaphragm having one face exposed to the pressure in said passage, an element movable in one direction by said diaphragm, a spring urging said element in the opposite direction, a second element movable in one direction by said diaphragm, and a heavier spring urging said second element in the opposite direction.

6. An air metering device for supplying compressed air to a container in pulsations of heavy pressure, comprising a passage adapted to be connected between a source of fluid under pressure and a container, a valve in said passage, and mechanism responsive to pressure in said passage beyond said valve for opening and closing said valve to effect pulsating delivery through said passage, said mechanism including a flexible diaphragm having one face exposed to the pressure in said passage, an element movable in one direction by said diaphragm to bias said valve toward closed position, a latch mechanism adapted to hold said valve against closure, a second element movable in the same direction by said diaphragm to release said latch mechanism, a spring urging said second element in the opposite direction to bias said valve toward open position, said latch mechanism being adapted to hold said valve against opening, and a lighter spring urging said first element in the opposite direction to release said latch mechanism.

7. An air metering device for supplying compressed air to a container in pulsations of heavy pressure, comprising a passage adapted to be connected between a source of fluid under pressure and a container, a valve in said passage, and mechanism responsive to pressure in said passage beyond said valve for opening and closing said valve to effect pulsating delivery through said passage, said mechanism including a flexible diaphragm having one face exposed to the pressure in said passage, an element movable in one direction by said diaphragm to bias said valve toward closed position, a latch mechanism adapted to hold said valve against closure, a second element movable in the same direction by said diaphragm to release said latch mechanism, a spring urging said second element in the opposite direction to bias said valve toward open position, said latch mechanism being adapted to hold said valve against opening, a lighter spring urging said first element in the opposite direction to release said latch mechanism, and means adjustable by the user for varying the compression of said lighter spring.

8. An air metering device for supplying compressed air to a container in pulsations of heavy pressure, comprising a passage adapted to be connected between a source of fluid under pressure and a container, a valve in said passage, and mechanism responsive to pressure in said passage beyond said valve for opening and closing said valve to effect pulsating delivery through said passage, said mechanism including a flexible diaphragm having one face exposed to the pressure in said passage, an element movable in one direction by said diaphragm to bias said valve toward closed position, a latch mechanism adapted to hold said valve against closure, a second element movable in the same direction by said diaphragm to release said latch mechanism, a spring urging said second element in the opposite direction to bias said valve toward open position, said latch mechanism being adapted to hold said valve against opening, a lighter spring urging said first element in the opposite direction to release said latch mechanism, means adjustable by the user for varying the compression of said lighter spring, and means inaccessible to the user for varying the compression of said first spring.

FREDERICK H. RAGAN.